March 11, 1941.    G. FRINK    2,234,693
CHANGE-SPEED MECHANISM
Filed Dec. 27, 1938    3 Sheets-Sheet 1
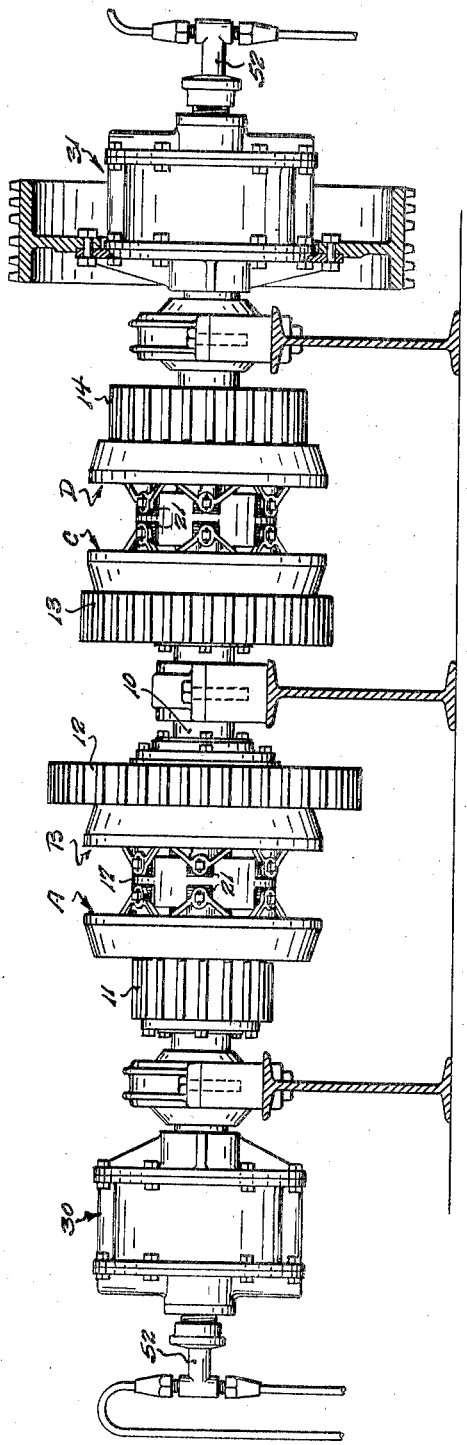
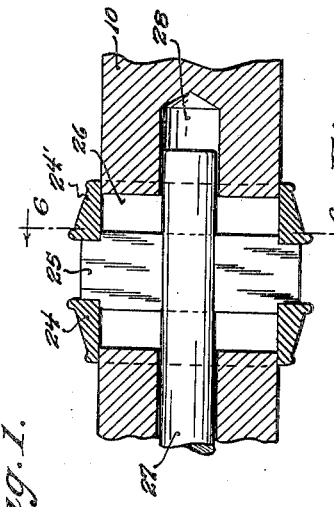
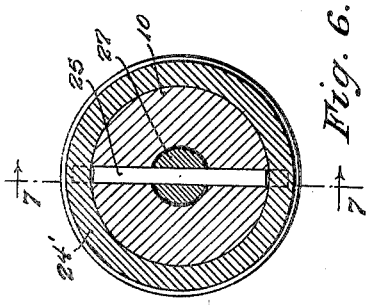
INVENTOR.
Gerald Frink
BY
ATTORNEYS.

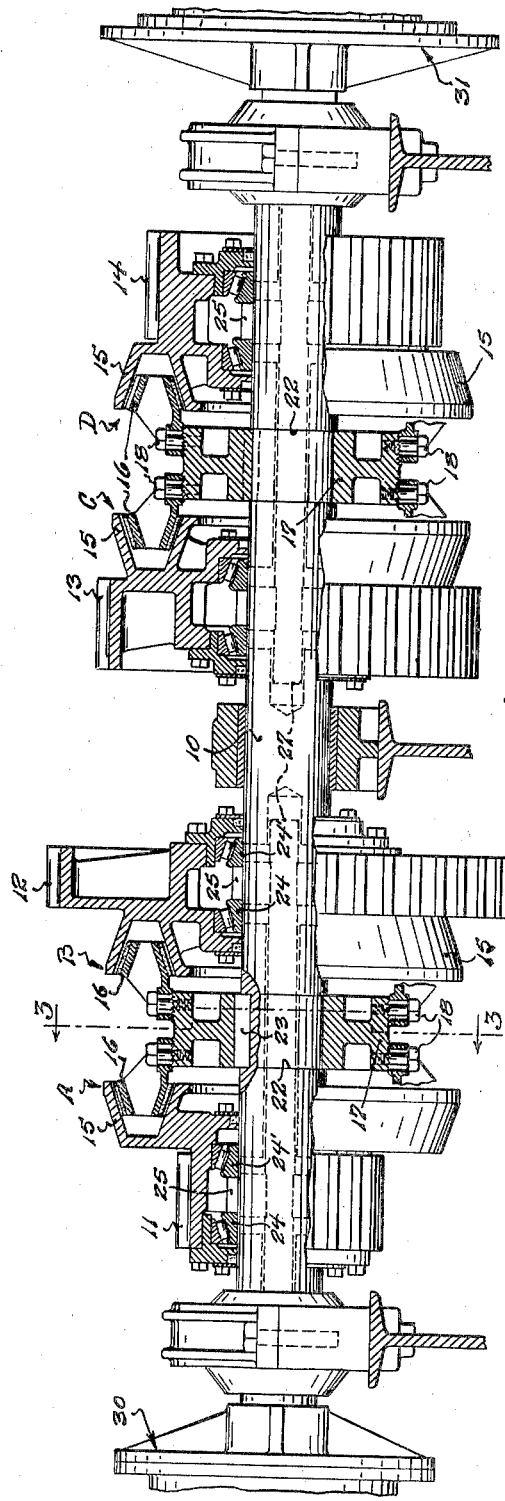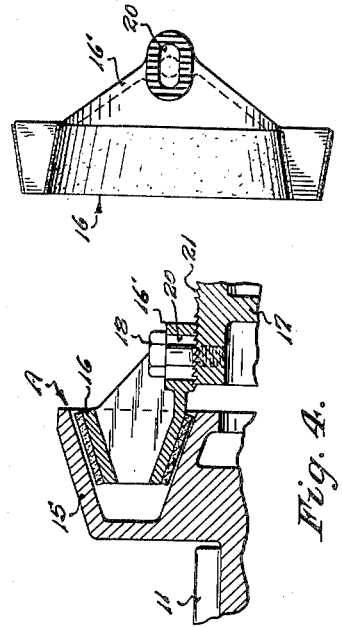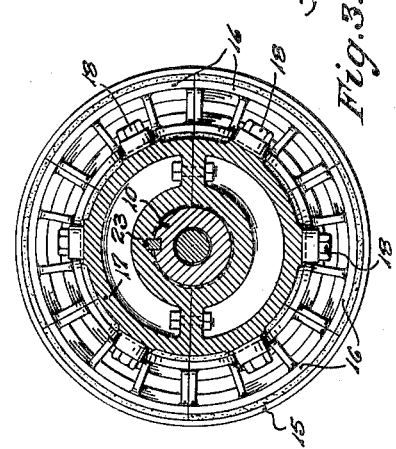

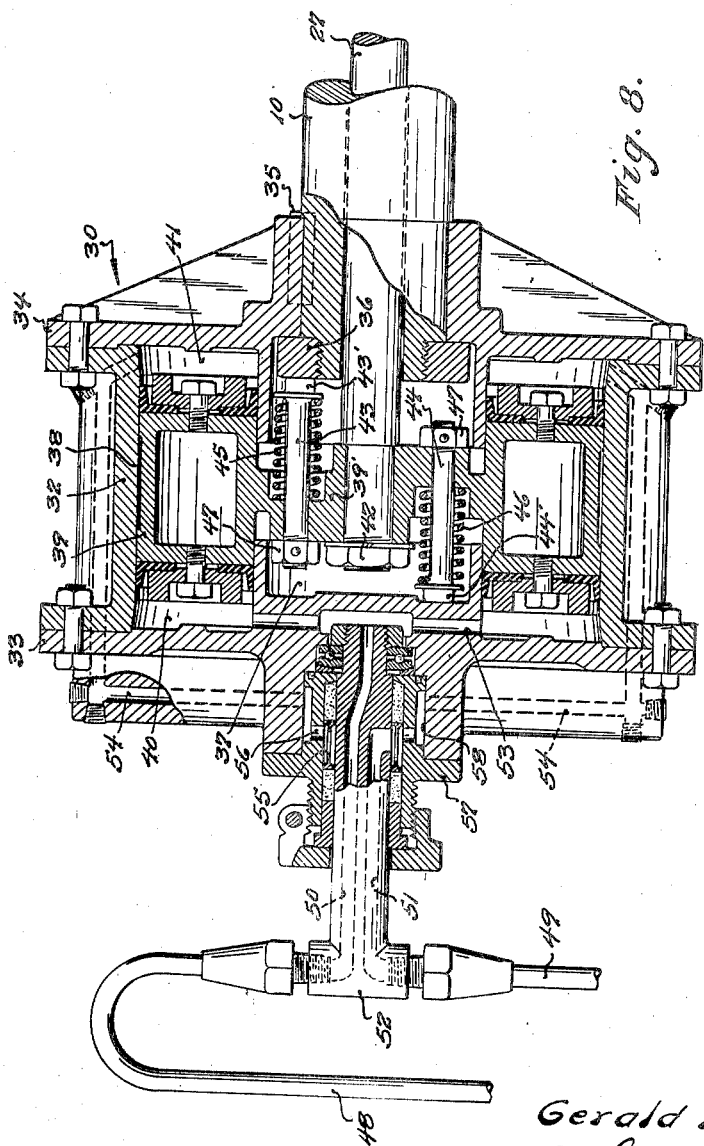

Patented Mar. 11, 1941.

2,234,693

UNITED STATES PATENT OFFICE 2,234,693

CHANGE-SPEED MECHANISM

Gerald Frink, Seattle, Wash., assignor to Washington Iron Works, Seattle, Wash., a corporation of Washington Application December 27, 1938, Serial No. 247,875

11 Claims. (Cl. 192—87)

This invention relates to change-speed mechanism for use in what is commonly known as a "yarder" and is, more especially, directed to that class of transmission employing multiple sets of constant-mesh gears in association with clutches therefor operating to selectively couple the gear sets to a drive shaft therefor.

It is a principal object of the present invention to provide a four-speed transmission including, with the drive shaft and the gear-coupling clutches, a pair of clutch-control shift rods housed by the drive shaft and operated one from one and the other from the opposite end of the shaft, the mechanism permitting gear changes to be instantly made by a full throw of a selected shift rod regardless of load or speed of the moving parts.

It is a further and particular object to provide advanced means for adjusting the clutches to accommodate wear on the facing shoes thereof.

It is a still further object to provide, in the control heads for activating the shift rods, self-equalizing mechanism operative to bring the rods into and yieldingly hold the same in neutral position automatically in response to a release of the fluid pressure agent by which clutch-engaging movement of the rods is effected.

Further objects and advantages of the invention will appear in the course of the following description and claims, the invention consisting in the novel construction, adaptation and combination of parts hereinafter described and claimed.

In the drawings:

Figure 1 is a side elevational view representing the drive shaft and associated gears and clutches of a four-speed transmission constructed according to the present invention.

Fig. 2 is a similar view taken to an enlarged scale and shown partly in longitudinal vertical section and partly in side elevation.

Fig. 3 is a transverse vertical section taken on line 3—3 of Fig. 2.

Fig. 4 is an enlarged fragmentary longitudinal vertical section detailing the clutch adjustment.

Fig. 5 is an underside plan view of one of the clutch shoes.

Fig. 6 is a transverse vertical section on line 6—6 of Fig. 7 detailing the rod and associated key by which the clutches are shifted longitudinally of the shaft.

Fig. 7 is a longitudinal vertical section taken on line 7—7 of Fig. 6; and

Fig. 8 is an enlarged longitudinal vertical section detailing one of the two control heads for the transmission.

The yarder assembly with which the present advancements are or may be employed provides main-line, haul-back and straw drums of which the former drum is carried on one shaft and the latter two drums carried on a shaft lying in laterally spaced parallel relation thereto. These drums are clutch-coupled with their respective supporting shafts and between such shafts and the source of power for driving the same are a pair of intermediate shafts constituting the transmission mechanism. The first of these intermediate shafts, referred to hereinafter as the driving shaft, carries a set of four normally loose but selectively coupled speed-change gears of differing radial dimensions constantly meshing complementary gears fast to the second or driven intermediate shaft, the latter shaft in turn driving the drum shafts through the instrumentality of constant-mesh gears fast to the driven and drum shafts. Inasmuch as the driven intermediate shaft, the fixed gears carried thereby, the drum shafts, and the gears, clutches and drums associated with the drum shafts are of well known form and application, no attempt is made to illustrate the same in the present disclosure, the several views being confined to the first or drive shaft of the transmission mechanism, the normally loose speed-change gears carried thereby, the coupling clutches therefor, the shifting rods, and the selector heads for shifting the rods.

Referring now to these illustrated parts, the numeral 10 designates the drive shaft on which are loosely mounted change-speed gears 11, 12, 13 and 14 selectively coupled to the shaft by clutches denoted generally by the letters A, B, C and D, the gears being integral with or otherwise fixed to the drum elements 15 of the clutches. Said drums, which desirably are conical in shape, lie in pairs between the gears controlled thereby and are disposed in opposing relation to one another with the shoe elements 16 therefor, likewise paired, being boltably secured to a drive ring 17 common thereto and lying intermediate the drums. Said shoe elements are segmental in shape and anchored to the drive ring by bolts 18, the bolts being received in longitudinal slots 20 formed in anchoring arms 16' which, on their underside, are formed with buttress teeth acting with complementary teeth 21 on the face of the ring to adjustably position the shoes. The drive ring, to permit the same to be fitted for end thrust in an annular groove 22 of the shaft, is built up (Fig. 3) from a pair of boltably interconnected members and is keyed as at 23 to the shaft.

Said clutches operate through longitudinal movement of the drum elements into and from frictional engagement with the fixed shoes, the drums being journaled with the associated gears on shiftable roller bearings of which race rings 24—24' are sleeved over the shaft at opposite sides of a shifting bar 25, the bar passing diametrically through a longitudinal slot 26 provided therefor in the shaft and being movable in the slot by a shifting rod 27 carried in a center-bore 28 of the shaft. The shaft, more particularly, is bored from opposite ends with each end bore receiving a shifting rod and each shifting rod carrying a pair of the shifting bars whereby the one rod, through its two bars, operates the clutches A and B and the other rod, likewise through its two bars, operates the clutches C and D, the collective operation of the clutches A and B or the clutches C and D, as the case may be, activating one of the two related clutch drums directively toward and the other directively from the interposed shoes. Selector heads denoted generally by 30 and 31 are provided for each of the two shifting rods.

Detailed in Fig. 8, the casing for said selector heads consists of a housing member 32 open at both ends and boltably received between end-wall members 33—34 of which the latter is fixed by key 35 and nut 36 to the end of the shaft, each of said end-wall members being formed with inwardly projecting hub flanges which terminate in spaced relation from one another and define inner and outer cylinders 37—38, respectively. Fitting the outer cylinder is a sliding piston 39 movable by admission of compressed air to the chambers 40 and 41 provided at opposite ends thereof and fitting the inner cylinder is an integral hub 39' fixed by a nut 42 to the protruding end of the shifting rod 27. Carried by the hub are a plurality of circumferentially spaced wall-abutting spring-bolts 43 and 44 on which are equalizing springs 45 and 46, respectively, the spring bolts being disposed in alternating relation to have the abutment heads 43' of one series of bolts abut one end wall of the cylinder 37 and the heads 44' of the other series of bolts abut the opposite end wall of the cylinder. The springs are set by the nuts 47 to obtain brushing contact only as between the heads and the end walls of the chamber in the neutral position of the piston.

Air or other fluid activating agent for operating the pistons of the selector heads selectively is delivered from a source of pressure supply and fed through tubing 48—49 to the ducts 50 and 51 of a non-rotary pipe 52 which is supported in axial relation to the end-wall member 33 of each of said heads, the duct 50 communicating with supply ducts 53 which lead to the inner chamber and the duct 51 communicating with supply ducts 54 which lead to the outer chamber of the related cylinder 38. To maintain communication as between the lateral outlet from the duct 51 and the admission end of the ducts 54 while permitting take-up of the packing surrounding pipe 52, I employ a conventional gland assembly including a lantern ring 55 the openings in which communicate by ports 56 in the stuffing box 57 with an annular channel 58.

While not shown, a control lever common to both of the selector heads and operating in the ordinary manner through a path of movement definitive of the letter H acts in response to a neutral positioning thereof to free the pistons of resistant air pressure by the exposure of the end chambers to the atmosphere, whereupon a previously activated piston is brought into neutral by the rebound power of the compression-loaded equalizing springs. Said springs, by their bare contact with the end walls of the inner cylinder in the neutral position of the hub, obviate overrunning from the reactive kick-back of the same.

The operation of the described parts is believed clear. It is of course obvious that numerous modifications might be resorted to without in any way departing from the spirit of the invention and I accordingly intend that no limitations be implied and that refinements in interpretation of the language of the hereto annexed claims be resorted to only where such refinements essentially describe the advance in the art.

What I claim, is:

1. In combination with a center-bored shaft, change-speed means employed to control the power ratio transmitted therefrom comprising four variable-ratio gears carried for normal free rotation on the shaft and shiftable longitudinally with respect thereto, said gears being arranged in sets of two with the two gears of each set axially spaced, opposingly disposed cone-type clutch drums for the gears of each of said sets fixed to the gears, a driving ring for each of the gear sets fixed to the shaft in the space between the opposing clutch drums, a plurality of segmentally formed clutch shoes for each of said clutch drums fixed to the driving ring, the shaft being slotted longitudinally in the sphere of shifting movement of each of the gears, a pair of shifting rods revoluble with the shaft and received from opposite ends in the bore thereof for shifting movements axially of the shaft, connection through the slots of the shaft from one of said shifting rods to the two gears of one gear set and connection through the slots of the shaft from the other shifting rod to the two gears of the other gear set for operating the clutch drums axially of the shaft into and out of clutching engagement with the related clutch shoes, a piston for each of said shifting rods fixed to the rod, a casing for each of said pistons fixed to the shaft, and means for operating said pistons selectively in opposite directions of axial movement within the respective casings.

2. The change-speed combination defined in claim 1 wherein equalizing springs compression-loaded by the clutch-operating shifting movements of the pistons are provided in opposingly disposed pairs for each of said pistons, said springs being substantially free of compression-load in the neutral positions of the pistons.

3. The change-speed combination defined in claim 1 wherein each of said gears is mounted on roller bearings including a pair of axially spaced race rings carried for collective shifting movement axially of the shaft, the connection between the gears and the shifting rods comprising shifting bars extending diametrically of the shaft through the slots thereof into the space between the paired race rings.

4. Change-speed means employed to control the power ratio transmitted from a driving shaft comprising, in combination with the shaft, independent gears mounted for normal free rotation thereon and arranged as a pair with one gear of the pair axially spaced from the other gear of the pair, a driving ring carried by and revoluble with the shaft in the space between the paired gears, drum-and-shoe clutch assemblies, one for each of the gears, received in the space between the paired gears with one element of each of said assemblies fixed to its related gear and the other element boltably connected to the driving ring, said ring and the element of the clutch assembly bolted thereto having thrust-resisting means provided on the meeting faces thereof permitting adjustment of the bolted element toward and from the related element of the clutch assembly, a shifting device movable longitudinally of the shaft, connection between said shifting device and a like element of each of the two clutch assemblies in the pair, and means for operating said shifting device in opposite directive movements selectively to have one element of one clutch assembly moved directively toward its related element and the like element of the other clutch assembly moved directively from its companion element simultaneously.

5. The change-speed means defined in claim 4, the shaft being center-bored and provided with longitudinal slots leading from the bore, and wherein the shifting device comprises an axially movable rod received in the bore of the shaft and connecting through said slots with the movable elements of the clutch assemblies.

6. The change-speed means defined in claim 4 wherein the thrust-resisting means on the meeting faces of the driving ring and the clutch elements bolted thereto comprise buttress teeth, the clutch elements being segmental in form.

7. Change-speed means comprising the combination of a center-bored shaft driven from a source of power, four variable-ratio gears carried by the shaft for normal free rotation thereon and shiftable longitudinally relative to the shaft, said gears being arranged in sets of two with the two gears of each set axially spaced, opposingly disposed cone-type clutch drums fixed to the paired gears, a single driving ring for each set of gears fixed to the shaft in the space between the opposingly disposed clutch drums, cone-type segmental clutch shoes for each of the clutch drums bolted to the driving ring, said clutch shoes and the driving ring having thrust-resisting buttress teeth provided on the meeting faces thereof to permit adjustment of the shoe segments, the shaft being slotted longitudinally in the sphere of shifting travel of the respective gears, a pair of shifting rods revoluble with the shaft and received from opposite ends in the bore thereof for shifting movements axially of the shaft, connection through the slots of the shaft operating to couple the two gears of one of the gear sets with one of the shifting rods and connection through the slots of the shaft operating to couple the two gears of the other gear set with the other shifting rod whereby movement of the rods acts through the gears to operate the clutch drums longitudinally of the shaft into and out of clutching engagement with the related clutch shoes, and means for actuating the shifting rods independently in opposite directive movements.

8. Change-speed means comprising the combination of a center-bored shaft driven from a source of power, four variable-ratio gears carried for normal free rotation on the shaft and shiftable longitudinally relative thereto, said gears being arranged in sets of two with the two gears of each set axially spaced, clutch drums fixedly associated with the gears and opposingly disposed, one to the other clutch drum of a gear set, a single driving ring for each gear set fixed to the shaft in the space between the opposingly disposed pair of clutch drums, respective clutch shoes for the several clutch drums fixedly associated with the driving ring, the shaft being slotted longitudinally in the sphere of shifting travel of the respective gears, a pair of shifting rods revoluble with the shaft and received from opposite ends in the shaft bore, connection through the slots of the shaft acting to couple the two gears of one gear set with one of the shifting rods and connection through the slots of the shaft acting to couple the two gears of the other gear set with the other shifting rod whereby shifting movement of the rods axially of the shaft operates through the gears to actuate the clutch drums longitudinally of the shaft into and out of clutching engagement with the related clutch shoes, a casing fixed to each end of the shaft, a piston supported within each of said casings for sliding movement longitudinally of the shaft axis, connection between one piston and one of the shifting rods and connection between the other piston and the other shifting rod, and means by which said pistons are operated within the respective casings independently.

9. Change-speed means comprising the combination of a center-bored and longitudinally slotted shaft, four variable-ratio gears carried by the shaft for normal free rotation thereon, said gears being arranged in sets of two with the two gears of each set axially spaced, clutch drums for the respective gears fixedly associated with the latter and opposingly disposed, one to the other clutch drum of a gear set, a single driving ring for each set of gears mounted on the shaft between the opposingly disposed clutch drums, clutch shoes for the respective clutch drums fixedly associated with the driving ring, a pair of shifting rods received in the shaft bore from opposite ends thereof and shiftable axially of the shaft independently of one another, coupling means extending through the slots of the shaft from one shifting rod to the clutch assemblies of one of the gear sets and from the other shifting rod to the clutch assemblies of the other gear set for actuating the drum and shoe elements of the clutch assemblies relatively toward and from one another, said coupling means acting to engage one and disengage the other clutch assembly of a gear set simultaneously, and means for operating said shifting rods independently in opposite directive movements.

10. Change-speed means comprising the combination of a center-bored and longitudinally slotted shaft, four variable-ratio gears carried by the shaft for normal free rotation thereon and arranged in pairs with one gear of each pair axially spaced from the other gear of the pair, a driving ring carried by and revoluble with the shaft in the space between the paired gears, drum-and-shoe clutch assemblies for the respective gears of which one element of each of said assemblies is fixedly associated with the related gear and the other element fixedly associated with the driving ring, a pair of axially shiftable rods received in the bore of the shaft from opposite ends thereof, connection through the slots of the shaft acting to couple like clutch elements of one pair of the gears with one of the shifting rods, connection through the slots of the shaft acting to couple like clutch elements of the other pair of gears with the other shifting rod, said connections acting in response to shifting movements of the rods to shift the clutch elements coupled thereto, one of said clutch elements directively toward and the other directively from its complementary element simultaneously, and selector devices by which the rods are shifted in opposite directive movements independently of one another.

11. Change-speed means comprising the combination of a center-bored and longitudinally slotted shaft, four variable-ratio gears carried by the shaft for normal free rotation with respect thereto, said gears being arranged in pairs, drum-and-shoe clutch assemblies for the respective gears of which one element of each assembly is fixedly associated with the related gear, driving rings carried by and revoluble with the shaft and fixedly associated with the other elements of the clutch assemblies, a pair of shifting rods received in the bore of the shaft from opposite ends thereof for shifting movements axially of the shaft, connection through the slots of the shaft operating to couple like clutch elements of one pair of said gears with one of the shifting rods, connection through the slots of the shaft operating to couple like clutch elements of the other pair of said gears with the other shifting rod, said connections acting in response to shifting movements of the rods to shift the clutch elements coupled thereto, one directively toward and the other directively from the complementary elements of the clutch assemblies simultaneously, and selector devices for shifting the rods in opposite directive movements independently of one another.

GERALD FRINK.